UNITED STATES PATENT OFFICE.

ALBERT EDWARD GESSLER, OF STATEN ISLAND, NEW YORK.

DISAZO COLORING-MATTERS AND PROCESS OF MAKING THE SAME.

1,281,938. Specification of Letters Patent. Patented Oct. 15, 1918.

No Drawing. Application filed December 20, 1917. Serial No. 208,051.

*To all whom it may concern:*

Be it known that I, ALBERT EDWARD GESSLER, a citizen of the German Empire, residing at Staten Island, borough of Richmond, county of Richmond, and State of New York, have invented certain new and useful Improvements in Disazo Coloring-Matters and Process of Making the Same, of which the following is a full, clear, and exact specification.

My invention relates to the production of coloring matters and refers particularly to the production of disazo coloring matters and their metallic salts.

I have discovered that the alkali-metal salts of certain disazo coloring matters are insoluble in water, oil and organic solvents, and that the metallic salts of such coloring matters also possess these valuable properties. They further possess the quality of not being readily sublimed.

My new coloring matters therefore, have valuable properties in both their sodium and metallic salts.

My invention relates particularly to the alkali-metal and metallic salts of the disazo compound producible by combining tetrazotized di-p-amido-ditolyl with naphthol-mono-sulfonic acids 2:6 or 2:7.

The following is one method of producing my new coloring matters:—

Dissolve 25 parts of the sodium salt of naphthol-sulfonic acid 2:6 in 2000 parts of water containing about 30 parts of ammonia (28% $NH_3$) and cool with ice to about 5 deg. C. Into this run, while well stirring, a solution made as follows:

10 parts of di-p-amido-ditolyl are suspended in a solution of 9:6 parts of sulfuric acid (97% $H_2SO_4$) in 200 parts of water and cooled down with ice to about 5 deg. C. Into this is introduced slowly an ice cooled solution of 8 parts of sodium nitrite in 80 parts of water and stirred for about 30 minutes, then filled up with ice water to 1500 parts. After running this into above solution, the mixture is stirred until the combination is complete.

The dyestuff thus produced can be washed, filtered and finished as such, or it can be transformed into one of its metal compounds by simply adding to it before, or after, washing, a solution of a salt of a metal, as, for instance, by adding a solution of 40 parts of copper sulfate in 400 parts of water, the resulting color being washed, filtered and finished.

The naphthol-sulfonic acid 2:6 in the above example, may be replaced by an equal amount of naphthol-sulfonic acid 2:7.

The coloring matters thus formed are most probably the salts of a compound having the formula

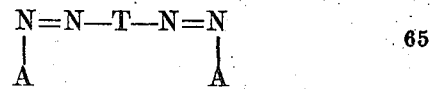

in which T represents the radical of di-p-amido-ditolyl, A represents a salt of the radical of the naphthol-mono-sulfonic acid and N represents nitrogen.

The alkali metal salts and the metallic salts are characterized by their insolubility in water, oil and organic solvents. Concentrated sulfuric acid produces a bright green-blue color, and reducing agents produce di-p-amido-ditolyl and amido-naphthol-mono-sulfonic acid 2:6 or 2:7 dependent upon the mono-sulfonic acid employed.

I do not limit myself to the particular compounds, quantities, temperatures or methods of procedure herein described, all of which may be varied without going beyond the scope of my invention as described and claimed.

What I claim is:—

1. The process of producing a salt of a disazo coloring matter which comprises combining the tetrazotized compounds of di-p-amido-ditolyl with a naphthol-mono-sulfonic acid.

2. The process of producing a salt of a disazo coloring matter which comprises combining the tetrazotized compound of di-p-amido-ditolyl with a naphthol-mono-sulfonic acid and converting the salt thus formed into a metallic salt of the coloring matter.

3. The process of producing a salt of a disazo coloring matter which comprises combining the tetrazotized compound of di-p-amido-ditolyl with a naphthol-mono-sulfonic acid and converting the salt thus formed into the copper salt of the coloring matter.

4. The process of producing a salt of disazo coloring matter which comprises combining the tetrazotized compound of di-p- amido-ditolyl with naphthol-mono-sulfonic acid 2:6.

5. The process of producing a salt of disazo coloring matter which comprises combining the tetrazotized compound of di-p-amido-ditolyl with naphthol-mono-sulfonic acid 2:6 and converting the salt thus formed into the copper salt of the coloring matter.

6. The disazo coloring matter producible by combining the tetrazotized compound of di-p-amido-ditolyl and a naphthol-mono-sulfonic acid, which coloring matter has most probably the following formula $$N=N-T-N=N$$
$$\vert \qquad \vert$$
$$A \qquad A$$

in which T represents the radical of di-p-amido-ditolyl, A represents a salt of the radical of naphthol-mono-sulfonic acid and N represents nitrogen; which coloring matter is insoluble in water, oil and benzole, non-sublimable, forming a greenish-blue color with concentrated sulfuric acid and reducible to di-p-amido-ditolyl and an amido-naphthol-sulfonic acid.

7. The disazo coloring matter producible by combining the tetrazotized compound of di-p-amido-ditolyl and naphthol-mono-sulfonic acid 2:6, which coloring matter has most probably the following formula

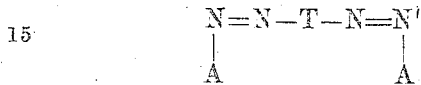

in which T represents the radical of di-p-amido-ditolyl, A represents a salt of the radical of naphthol-mono-sulfonic acid 2:6 and N represents nitrogen; which coloring matter is insoluble in water, oil and benzole, non-sublimable, forming a greenish-blue color with concentrated sulfuric acid and reducible to di-p-amido-ditolyl and amido-naphthol-sulfonic acid 2:6.

8. The disazo coloring matter producible by combining the tetrazotized compound of di-p-amido-ditolyl and a naphthol-mono-sulfonic acid, which coloring matter has most probably the following formula

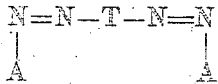

in which T represents the radical of di-p-amido-ditolyl, A represents a copper salt of the radical of naphthol-mono-sulfonic acid and N represents nitrogen; which coloring matter is insoluble in water, oil and benzole, non-sublimable, forming a greenish-blue color with concentrated sulfuric acid and reducible to di-p-amido-ditolyl and an amido-naphthol-sulfonic acid.

9. The disazo coloring matter producible by combining the tetrazotized compound of di-p-amido-ditolyl and naphthol-mono-sulfonic acid 2:6, which coloring matter has most probably the following formula

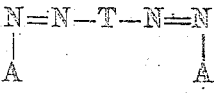

in which T represents the radical of di-p-amido-ditolyl, A represents a copper salt of the radical of naphthol-mono-sulfonic acid 2:6 and N represents nitrogen; which coloring matter is insoluble in water, oil and benzole, non-sublimable, forming a greenish-blue color with concentrated sulfuric acid and reducible to di-p-amido-ditolyl and amido-naphthol-sulfonic acid 2:6.

Signed at Staten Island, in the county of Richmond and State of New York, this 18th day of December, 1917.

ALBERT EDWARD GESSLER.